(12) United States Patent
Van De Laar et al.

(10) Patent No.: US 12,730,127 B2
(45) Date of Patent: Sep. 8, 2026

(54) ATOMIC FORCE MICROSCOPE (AFM) DEVICE AND METHOD OF OPERATING THE SAME

(71) Applicant: Nearfield Instruments B.V., Rotterdam (NL)

(72) Inventors: Jakob Van De Laar, Oosterhout (NL); Hamed Sadeghian Marnani, Rotterdam (NL); Arseniy Kalinin, Rotterdam (NL)

(73) Assignee: Nearfield Instruments B.V., Rotterdam (NL)

( * ) Notice: Subject to any disclaimer, the term of this patent is extended or adjusted under 35 U.S.C. 154(b) by 287 days.

(21) Appl. No.: 18/709,243

(22) PCT Filed: Dec. 23, 2022

(86) PCT No.: PCT/NL2022/050755

§ 371 (c)(1),
(2) Date: May 10, 2024

(87) PCT Pub. No.: WO2023/121463

PCT Pub. Date: Jun. 29, 2023

(65) Prior Publication Data

US 2025/0004010 A1 Jan. 2, 2025

(30) Foreign Application Priority Data

Dec. 24, 2021 (NL) ..................................... 2030290

(51) Int. Cl.
*G01Q 10/06* (2010.01)
*G01Q 30/06* (2010.01)
*G01Q 60/24* (2010.01)

(52) U.S. Cl.
CPC .......... *G01Q 10/065* (2013.01); *G01Q 30/06* (2013.01); *G01Q 60/24* (2013.01)

(58) Field of Classification Search
CPC ...... G01Q 10/065; G01Q 30/06; G01Q 60/24; G01Q 10/06
See application file for complete search history.

(56) References Cited

U.S. PATENT DOCUMENTS 5,144,128 A * 9/1992 Hasegawa ............. G01Q 70/02 977/863
5,222,396 A * 6/1993 Takata .................. G01Q 60/16 850/28

(Continued)

FOREIGN PATENT DOCUMENTS

EP 3447504 A8 * 4/2019 ............. G01Q 60/38
WO WO-2006092109 A1 * 9/2006 ............. G01Q 60/22
WO WO-2018212645 A8 * 12/2018 ............. G01Q 60/24

OTHER PUBLICATIONS

XP000871836, Inagaki K et al., "Ultrasonic Force Microscopy in Waveguide Mode up To 100 MHZ", 1998 IEEE Ultrasonics Symposium Proceedings. Sendai, Miyagi, JP, Oct. 5-8, 1998; [IEEE Ultrasonics Symposium Proceedings], Oct. 5, 1998 New York, NY : IEEE, US-ISBN 978-0-7803-4096-1 ; ISBN 0-7803-4096-5, pp. 1255-1259.

(Continued)

*Primary Examiner* — David A Vanore
(74) *Attorney, Agent, or Firm* — Banner & Witcoff, Ltd.

(57) ABSTRACT

An atomic force microscopy (AFM) device (1) is disclosed that comprises at least one scan head for scanning a sample (9). A first actuator (20) cooperates with at least one of the scan head or a substrate holder (95) for moving a probe tip of the scan head and the sample relative to each other in one or more directions parallel to a surface (91) of the sample for scanning of the surface with the probe tip. A cantilever deflection detector (30) measures a deflection (d) of the probe relative to the scan head during said scanning, and provides an output signal indicative of the deflection. A (Continued)

controller (40) of the AFM-device receives and analyzes the output signal from the cantilever deflection detector for measuring a deflection of the probe and automatically adapts one or more imaging parameters during said scanning in accordance with information about sample properties near the location of the sample currently being scanned. The information about sample properties comprises one or more of information from a specification of the sample, a recipe for manufacturing the sample and information obtained from a scanning according to a previous scan line in a direction substantially parallel to the current scan line, or from the current scan line itself.

20 Claims, 6 Drawing Sheets

(56) References Cited

U.S. PATENT DOCUMENTS 5,283,442 A * 2/1994 Martin ........ G01Q 30/04 977/869
5,406,832 A * 4/1995 Gamble ........ G01Q 10/06 977/851
5,670,712 A * 9/1997 Cleveland ........ G01Q 20/00 977/872
5,831,181 A * 11/1998 Majumdar ........ G03F 7/0002 83/919
5,965,881 A * 10/1999 Morimoto ........ B82Y 35/00 977/851
6,518,570 B1 * 2/2003 Hough ........ G01Q 10/06 977/869
9,110,092 B1 * 8/2015 Magonov ........ G01Q 60/32
9,678,103 B2 * 6/2017 Abramovitch ........ G01Q 20/02
11,079,405 B1 * 8/2021 Hu ........ B82Y 35/00
12,584,942 B1 * 3/2026 Noh ........ G01Q 60/40
2004/0084618 A1 * 5/2004 Spizig ........ G01Q 10/06 850/10
2005/0050947 A1 * 3/2005 Kitajima ........ G01Q 60/32 250/234
2005/0120781 A1 * 6/2005 Kitamura ........ G01Q 10/065 850/57
2005/0242283 A1 * 11/2005 Hasegawa ........ G01Q 30/04 250/310
2006/0000263 A1 * 1/2006 Su ........ G01Q 10/065 73/105
2006/0113469 A1 * 6/2006 Baba ........ G01Q 10/06 250/310
2006/0284083 A1 * 12/2006 Kurenuma ........ B82Y 35/00 250/309
2007/0018097 A1 * 1/2007 Kojima ........ G01Q 10/06 250/309
2007/0033991 A1 * 2/2007 Rice ........ G01Q 30/04 73/105
2009/0307809 A1 * 12/2009 Ziegler ........ G01Q 60/30 850/62
2010/0128342 A1 * 5/2010 Abramovitch ........ G02F 2/00 359/325
2010/0170016 A1 * 7/2010 Schilling ........ B62D 65/02 850/21
2011/0191917 A1 * 8/2011 Abramovitch ........ G01Q 10/065 850/1
2011/0277192 A1 * 11/2011 Park ........ G01Q 10/065 850/1
2014/0223615 A1 * 8/2014 Shi ........ G01Q 10/065 850/5
2016/0356808 A1 * 12/2016 Jo ........ G01Q 30/06
2017/0038410 A1 * 2/2017 Serry ........ G01Q 60/32
2017/0227577 A1 * 8/2017 Liu ........ G01Q 30/06
2017/0343580 A1 * 11/2017 Nagata ........ G01Q 60/18
2018/0106830 A1 * 4/2018 Fantner ........ G01Q 20/02
2018/0299480 A1 * 10/2018 Ohta ........ G01Q 20/02
2019/0056428 A1 * 2/2019 Schwarz ........ G01Q 60/32
2019/0094265 A1 * 3/2019 Sahin ........ G01Q 60/38
2019/0310315 A1 * 10/2019 Sertel ........ G01R 31/3025
2020/0041541 A1 * 2/2020 Osechinskiy ........ G01Q 10/04
2021/0125809 A1 * 4/2021 Sun ........ H01J 37/28
2021/0389345 A1 * 12/2021 Van Neer ........ G01Q 60/32
2022/0035274 A1 * 2/2022 Tetsuno ........ G03G 15/161
2022/0057430 A1 * 2/2022 Herfst ........ G01Q 10/045
2022/0170866 A1 * 6/2022 Li ........ G03F 7/7085
2022/0236228 A1 * 7/2022 Van Es ........ G01N 29/0681
2022/0326148 A1 * 10/2022 Bhargava ........ G01N 21/3563
2022/0373575 A1 * 11/2022 Lee ........ G01Q 20/02
2022/0404395 A1 * 12/2022 Ryu ........ G01Q 70/06
2023/0020068 A1 * 1/2023 Liu ........ G01Q 60/38
2023/0046236 A1 * 2/2023 Jo ........ G01Q 10/06
2023/0143659 A1 * 5/2023 Zabbal ........ G01N 29/0681 850/10
2023/0184807 A1 * 6/2023 Zabbal ........ G01Q 30/04 850/10
2023/0393169 A1 * 12/2023 Sadeghian Marnani ........ G01Q 20/02
2024/0110939 A1 * 4/2024 Sadeghian Marnani ........ G01Q 10/06
2024/0125692 A1 * 4/2024 Foley ........ G01N 21/1717
2024/0168053 A1 * 5/2024 Wagner ........ G01Q 30/02
2024/0264199 A1 * 8/2024 Ukraintsev ........ G01Q 10/065
2024/0295583 A1 * 9/2024 Sadeghian Marnani ........ G01Q 20/02
2024/0345129 A1 * 10/2024 Zhao ........ G01Q 30/04
2024/0393363 A1 * 11/2024 Ettefagh ........ G01Q 70/04
2024/0402215 A1 * 12/2024 Arai ........ G01Q 10/06
2025/0067769 A1 * 2/2025 Sadeghian Marnani ........ G01Q 60/32
2025/0164522 A1 * 5/2025 Hirade ........ G01Q 10/02
2025/0164523 A1 * 5/2025 Lefever ........ G01Q 20/02

OTHER PUBLICATIONS

International Search Report and Written Opinion—PCT/NL2022/050755—mailing date Jun. 29, 2023.

* cited by examiner

ATOMIC FORCE MICROSCOPE (AFM) DEVICE AND METHOD OF OPERATING THE SAME

CROSS-REFERENCE TO RELATED APPLICATIONS

This application is a U.S. National Stage application under 35 U.S.C. § 371 of International Application PCT/NL2022/050755 (published as WO 2023/121463 A1), filed Dec. 23, 2022, which claims the benefit of priority to Application NL 2030290, filed Dec. 24, 2021. Benefit of the filing date of these prior applications is hereby claimed. Each of these prior applications is hereby incorporated by reference in its entirety

BACKGROUND

The present invention pertains to an Atomic Force Microscope (AFM) device.

The present invention further pertains to a method of operating an AFM device.

AFM-devices are widely used for example in the semiconductor industry to determine a surface topography of a (semi-finished) product. An AFM-device comprises a scanning head with a tip that is scanned along the surface of a sample along a scanning trajectory. Therewith the operation of the AFM-device is determined by various imaging parameters, such as a force threshold, a baseline offset, an approach profile, a retract profile and a scanning speed.

Practical samples for examination in the semiconductor industry typically comprise 3D samples with narrow and high aspect-ratio features. Therewith the surface topography as imaged by the AFM-device may deviate from the actual surface topography of the sample due to various causes. For example, when the tip is present on a relatively narrow feature, then a relatively high level of the contact force may cause the tip to slip off from the top of the narrow feature, so that it slides to a lower level. Therewith the height value as indicated in the imaged surface topography for a lateral position x,y is less than the actual height of the sample at that lateral position. As another example, it has been found that deviations can occur when the tip is present at the lateral position of a narrow and relatively deep recessed portion of the sample. An example thereof is a feature having a characteristic lateral size that is moderately larger than the diameter of the tip, i.e. larger than one times the diameter of the tip, but smaller than ten times the diameter of the tip and a depth substantially larger than the width, e.g. more than two times the diameter. The feature is for example a hole, of which the characteristic lateral size is its diameter, or a trench, of which the characteristic lateral size is its width. Deviations may occur in this case because the contact-force exerted by the tip is not sufficient to outweigh friction forces exerted on the tip by a wall of the recessed portion, so that the tip does not fully protrude into the recessed portion. In that case the height value as indicated in the imaged surface topography for a lateral position x,y is greater than the actual height of the sample at that lateral position. It is noted that these deviations generally are less if the stiffness of the tip-cantilever combination is relatively high. The stiffness of the tip-cantilever combination is determined by the rotational stiffness of the cantilever and the flexural stiffness of the tip. Other local device properties may also affect the image surface topography. For example a feature of a relatively hard material may appear to be positioned at a higher level in the imaged surface topography than a feature of a relatively soft material, even if both features actually are at the same level in the imaged surface of the 3D sample.

SUMMARY

It is a first object of the present disclosure to provide a method of operating an AFM device that renders possible a more accurate imaging of 3D samples by mitigating deviations in the imaged surface topography from the actual device topography dependent on local device features, such as deviations in the presence of narrow and high aspect-ratio features and/or deviations related to variations in surface hardness.

It is a second object of the present disclosure to provide an AFM device that renders possible a more accurate imaging of 3D samples by mitigating deviations in the imaged surface topography from the actual device topography dependent on local device features.

In accordance with the first object, the method of operating an AFM device comprises:

- Scanning a probe with a tip along a surface of a sample along a current scan line in a first lateral direction;
- Measuring an interaction between the tip and the sample;
- Based on prior information about the sample adapting one or more imaging parameters during said scanning, which one or more imaging parameters include a force threshold;

The prior information about the sample comprises information about the sample obtained prior to said scanning. The prior information about the sample obtained prior to said scanning may for example comprise information from a specification of the sample and/or information about the sample obtained during recipe creation. The specification of the sample specifies the desired topography of the sample, as well as the properties of the materials used for the features thereof. Information about the sample obtained during recipe creation may indicate that the actual topography tends to deviate in a certain way from the designed topography. Although the information obtained during recipe creation does not fully describe the actual topography, it helps to predict the way in which the actual topography deviates. For example, the information obtained during recipe creation may indicate that edges are on average less wide than originally was specified. Prior information about the sample renders it possible to scan surface elements of the sample with optimal settings so that the output signal obtained with these settings more accurately indicates the actual height of the surface as a function of the lateral position. The information about the sample obtained prior to said scanning may further comprise information obtained from a preceding device inspection method, for example information obtained from an electron microscopic image of the sample.

The force threshold is an upper limit to a force exerted by the tip on the sample.

Based on the information about the sample obtained prior to said scanning, a relatively high force threshold is selected if information from the region of the current scan position indicates that the current scan point is expected to be within a relatively deep and narrow recess or at a bottom close to a steep wall and a relatively low force threshold is selected if the information from the region indicates a relatively wide recess or wide flat area away from relatively steep and high edges/walls.

Whereas the information about the sample obtained prior to said scanning does not always exactly correspond to the actual topology of the sample, this information renders it possible to set the force threshold optimally for the purpose of more exactly determining the actual topology.

For example surface elements having a high level that are close to a low level are more accurately imaged with a relatively low force threshold setting. Therewith the risk of a lateral sliding of the tip towards a lower level is mitigated. This also reduces the risk of damage caused by the tip on the sample surface. As another example a relatively narrow and deep recess in the surface of the sample is more accurately imaged with a relatively high force threshold setting. Therewith the force exerted on the tip can more easily overcome forces, e.g. due to friction, exerted thereon by the sidewalls of the recess. Therewith the depth of the recess is more accurately indicated in the imaged surface topography.

The information about the sample may further comprise information obtained from a scanning according to a previous scan line in a direction substantially parallel to the current scan line.

The present invention in particular is suitable to a trigger based scanning embodiment. Therein the scanning comprises a scanning cycle for each scanning position with the following stages: a) with the tip approaching the sample at a lateral position of the sample surface, b) retracting the tip from the sample and c) displacing the tip towards a new lateral position. Interaction data indicative for an interaction between the tip and the sample is obtained during said approaching and/or retracting, Approaching the sample in stage a) is determined by an approach profile. As example imaging parameters to be adapted thereof are an initial height from which the sample surface is approached and a velocity with which the sample is approached.

Retracting the sample is determined by a retract profile. As example imaging parameters to be adapted thereof are a force threshold, and/or a displacement threshold and/or a retract distance and/or velocity. For example retraction of the tip from the sample starts if the force exerted by the tip exceeds a pre-specified force threshold. In another example retraction starts if the measured depth exceeds a depth threshold. In again another example retraction starts as soon as one of these conditions occurs, whichever is the first, or alternatively retraction starts once both conditions are satisfied. Another imaging parameter relevant for the retraction stage is the retract distance. In an example the retract distance is increased for locations where the adhesion of the surface is determined to be relatively high. Furthermore, the retract distance may be adapted on the fly. I.e. retraction may be interrupted, and the surface may be approached again if it is detected that ringing of the cantilever is reduced to a sufficient extent, even before retraction over the predetermined distance has been completed. Therewith measurement speed is improved.

In operation the cantilever is flexed due to forces acting between the tip and the sample surface. Also due to electrostatic forces a flexure of the cantilever may occur even at larger distances from the sample. This causes a bias which may be compensated for by taking into account a baseline offset. If desired, the baseline offset may be updated each measurement cycle.

It is noted that more than one imaging parameter may be adapted during operation. For example the baseline offset and the force threshold may both be adapted dependent on the prior information of the sample at the lateral position to be scanned and the force threshold is chosen relative to the baseline offset.

As specified above, the prior information about the sample may comprise information from a specification of the sample. This may comprise device design data and/or recipe data. It may be assumed that under normal circumstances the topography of the sample to be measured is approximated by the topography as derived from prior information about the sample, for example from the specification of the sample and/or information obtained during recipe creation. By adapting one or more imaging parameters during said scanning in accordance with the expected topography a substantial improvement is obtained as compared to the case that a uniform set of settings is used for imaging the entire sample even though the actually scanned position may deviate slightly from the desired scan position and the topography of the structure to be imaged may actually deviate to a certain extent from the topography as originally designed.

As further specified the prior information about the sample may comprise information obtained from a scanning according to a previous scan line in a direction substantially parallel to the current scan line. Provided that the current scan line and the previous scan line are close enough to each other, the topography of the current scan line is approximated by the topography of the previous scan line, so that again a substantial improvement is obtained as compared to the case that a uniform set of settings is used for imaging the entire sample.

In some examples subsequent scanlines are substantially parallel. I.e. in that case subsequent scanlines are at a mutual distance $\Delta y$. In operation scanning proceeds by a movement of the probe in a direction x along a scanline y, $y+\Delta y$, $y+2\Delta y$, . . . etc. Alternatively, instead of stepwise increasing the coordinate y between subsequent scanlines, it is possible to gradually increase y while scanning. Therewith a triangular scan path is followed.

It is noted that it is not necessary that subsequent scanlines are exactly parallel to each other.

In some embodiments imaging parameters are adapted during scanning based on prior information about the sample and from prior information obtained from a previous scan line. Therewith a still further improvement is achieved.

In some embodiments prior information about the sample is used in combination with information obtained while scanning. For example if it appears at a position x along a current scan-line y that the topography strongly deviates from that at position x along the previous scan-line $y-\Delta y$ this deviation may be incorporated when preparing the adaptation of the settings for the subsequent position $x+\Delta x$ along the current scan-line.

An embodiment further comprises supplying an acoustic signal to one or more of the probe, the tip or the sample and analyzing an output signal based on an interaction of the acoustic signal with the sample. The output signal is indicative for subsurface characteristics of the sample. Therewith, in a common measurement both topographic information and subsurface information can be obtained, for example for the purpose of overlay and/or alignment analysis.

The force exerted by the tip on the sample is proportional to deflection of the cantilever and the stiffness of the cantilever. In an embodiment a vibration of the probe is induced to change an effective force exerted by the probe to the sample. The vibration increases the stiffness of the cantilever and therewith also increases the effective force exerted to the sample.

Whereas the present approach aims to avoid that a same position or line is scanned more than once, it may occasionally happen that an analysis of the image data obtained during scanning reveals that it is desirable to perform one or more additional scans with different imaging parameter settings. In that case the image data obtained from an additional scan may replace the original image data or the original image data and the new image data obtained from one or more additional scans may be combined.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION OF EMBODIMENTS

Figure 1:
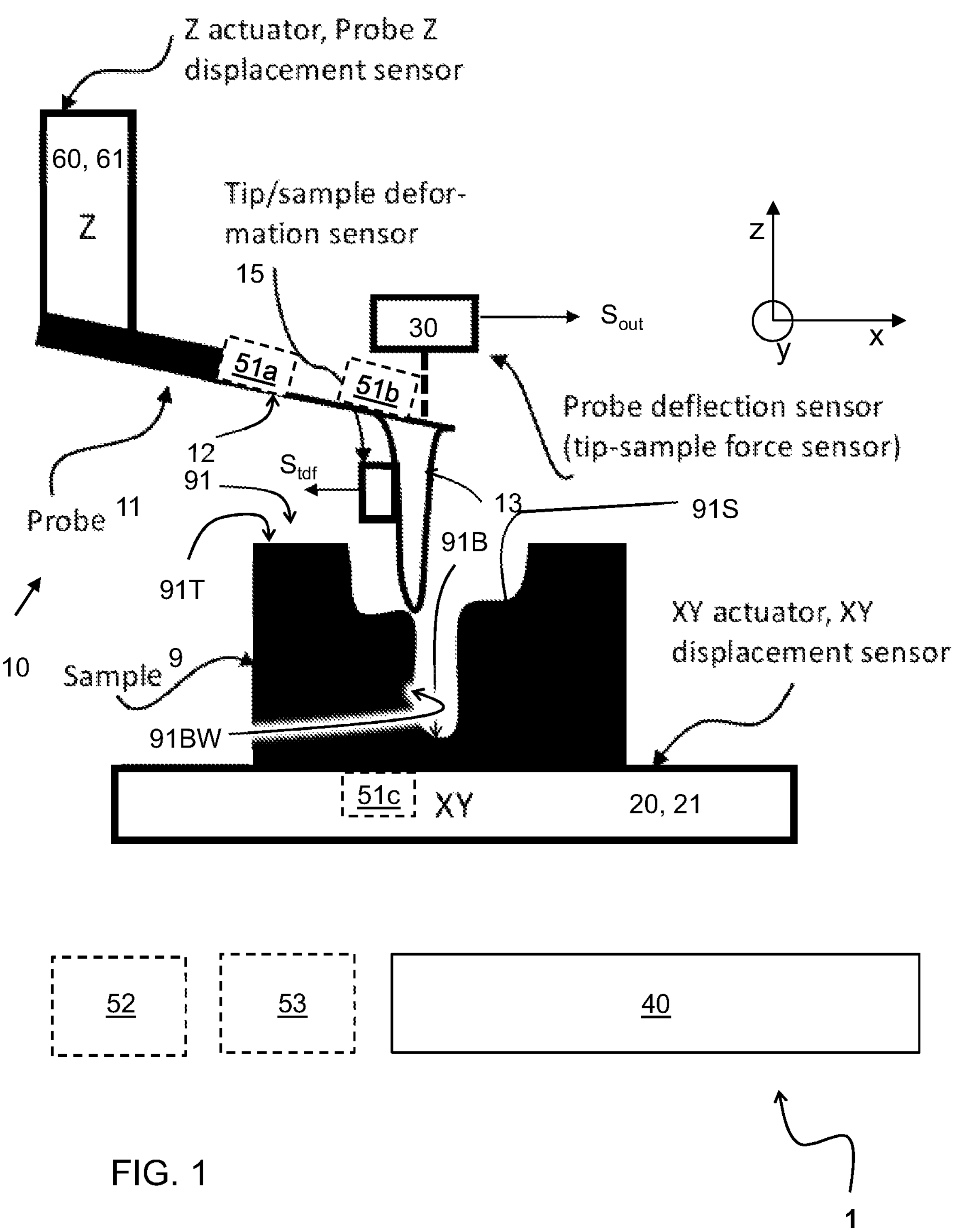
FIG. 1 schematically shows a part of an exemplary improved AFM-device and a sample scanned therewith.
Figure 2:
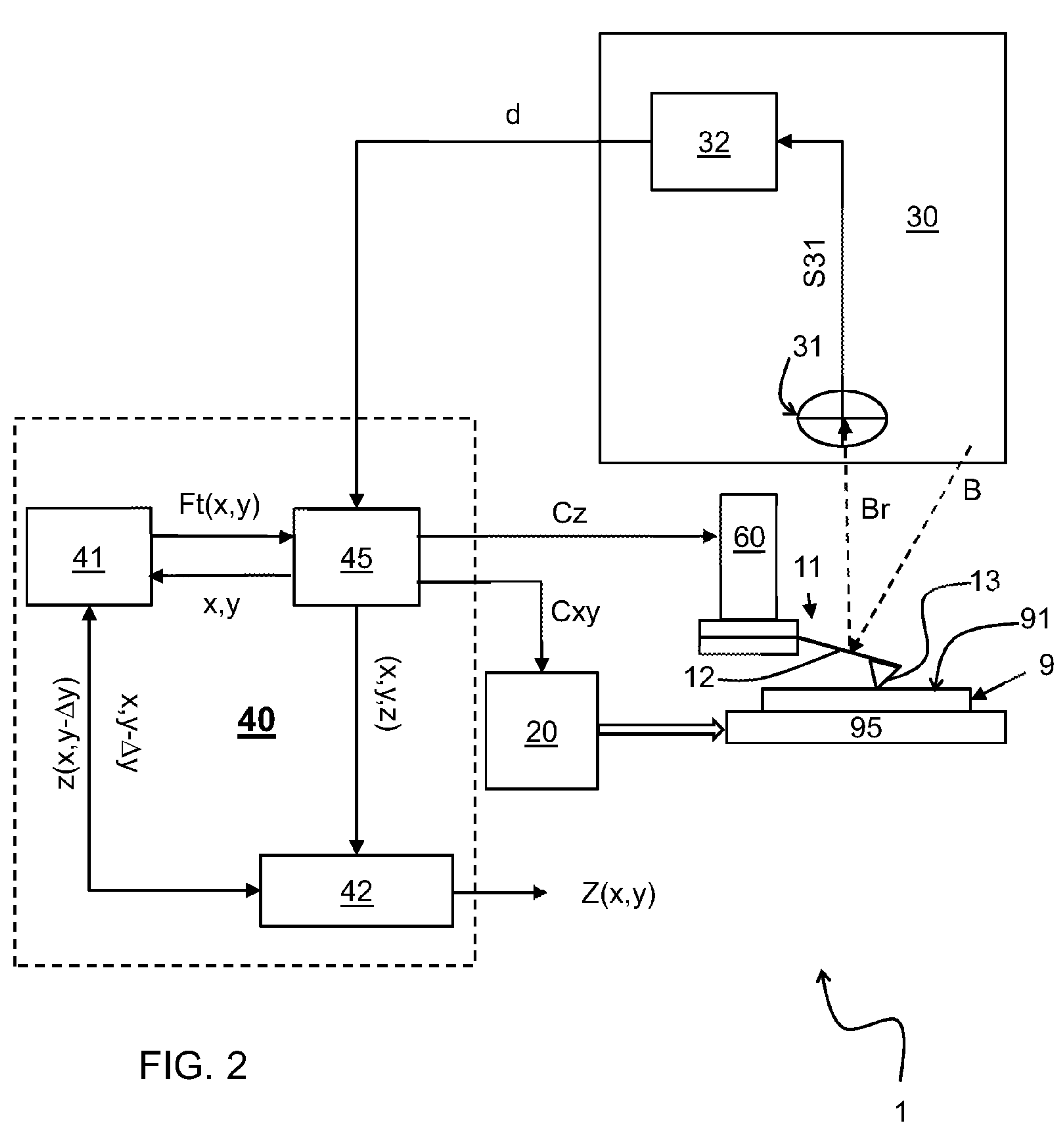
FIG. 2 shows aspects of a controller of a first embodiment of the improved AFM-device.

An embodiment of an improved atomic force microscopy (AFM) device 1 is described herein with reference to FIGS. 1 and 2. FIG. 1 schematically shows a part of an exemplary improved AFM-device 1 and a sample 9 scanned therewith; FIG. 2 shows aspects of a controller of a first embodiment of the improved AFM-device;

As shown in FIG. 1, the AFM-device 1 comprises at least one scan head 10 for scanning a sample 9. The scan head 10 includes a probe 11 that comprises a cantilever 12 and a probe tip 13 arranged on the cantilever.

The AFM-device 1 further comprises a first actuator 20 that cooperates with a substrate holder 95 in order to move the probe tip 13 and the sample 9 relative to each other in one or more directions x, y parallel to a surface 91 of the sample for scanning of the surface with the probe tip. In other embodiments the first actuator cooperates with the scan head and in again other embodiments a respective first actuator is provided to cooperate with the scan head and the substrate holder for scanning of the surface 91.

The AFM-device 1 further comprises a cantilever deflection detector 30 that is configured to measure a motion/position of the probe tip 13 relative to the scan head 10 and sample during said scanning. The detector 30 is further configured to providing an output signal Sout, that is indicative of the deflection of the cantilever due to the tip-sample interaction, and as such (in the static regime) of the applied force.

The sample topography is derived from the height of the AFM head minus the tip-head distance as indicated by the cantilever deflection.

In the embodiment shown, also a tip deformation sensor 15 is provided that provides a sense signal $S_{tdf}$, indicative for a deformation of the tip 13 when contacting the surface 91 of the sample 9. The AFM-device 1 still further comprises a controller 40, that is configured to receive and analyze the output signal Sout from the cantilever deflection detector 30, for imaging sample characteristics at and/or below the surface 91 of the sample 9. In the embodiment of FIG. 1, the controller 40 further receives additional information for its analysis, such as position signals x, y indicating the lateral position of the probe tip as indicated by the control signal of the XY actuator 20 and/or by the displacement sensor 21, as well as the z-position of the probe as indicated by the control signal for the Z actuator 60 and/or by the displacement sensor 61. In the example shown, the controller 40 also receives the sense signal $S_{tdf}$, indicative for a deformation of the tip 13. The controller 40 is configured to reduce a force threshold if the indicated deformation of the tip exceeds a predetermined limit. Alternatively and/or additionally it may be configured to process an output signal obtained by the device to compensate for deviations caused by the deformation of the tip 13.

The AFM-device is configured to perform a scanning cycle for each scanning position with the following stages.

In a first stage the tip 13 approaches the sample 9 according to an approach profile wherein it starts from a reference position z above the sample 9. The approach profile specifies the reference position z, which is for example a predetermined z-value which is higher than any z-value at the surface 91 of the sample 9. Alternatively the reference position z is a relative position at a predetermined distance with reference to an expected z-value of the surface at the lateral coordinate x,y to be approached. The approach profile further specifies the velocity with which the surface 91 is approached. This is for example a constant velocity. Alternatively the velocity is variable, for example starting with a relatively high velocity and stepwise or gradually reducing the velocity while approaching.

In a second stage, the tip 13 is retracted from the sample surface 91. The transition from the first stage to the second stage may be determined by one or more of the following. According to one option the transition takes place if the tip or the probe has progressed a predetermined distance towards the sample. According to another option the transition takes place if a force exerted by the tip exceeds a threshold value. According to a still further option, retraction starts as soon as one of these conditions occurs, whichever is the first, or alternatively retraction starts once both conditions are satisfied. Another imaging parameter relevant for the retraction stage is the velocity with which retraction occurs. Operation in the second stage is determined by a velocity with which retraction is performed. As in the approach profile, the velocity may be a constant value, or may change during retraction.

In a third stage the tip is displaced towards a subsequent lateral position. The magnitude of the lateral distance is an example of a further imaging parameter.

During the first and/or the second stages interaction data is obtained that is indicative for an interaction between the tip and the sample. In an example a tip-sample force curve is determined, which specifies the force between the tip and the sample as a function of the displacement of the tip towards and/or away from the sample.

As is typical for various practical types of samples, the sample 9 shown in FIG. 1 has surface sections 91B, 91S and 91T at various levels. In the example shown in FIG. 1, the tip 13 is currently positioned at the edge of a shoulder section 91S with a bottom section 91B. Due to a downward force exerted at the tip 13 there is a risk that a deformation of the cantilever 12 and/or tip occurs that causes the tip 13 to slide towards the bottom section 91B, so that the cantilever deflection detector 30 indicates a lower z-value than that of the position x,y where the tip 13 was originally positioned. Although this phenomenon only occurs near the edge of a section with a lower level section, the measurement errors become significant for samples with surface features having a high aspect ratio. If the tip 13 is positioned at the location x,y of the bottom section 91B, the walls 91BW of the bottom section 91B near the tip 13 exert forces on the tip that may prevent the tip to sufficiently approach the bottom section 91B, so that the cantilever deflection detector 30 indicates a higher z-value than the actual z-value at the position x,y of the tip 13. Also this type of measurement error becomes more significant if the aspect ratio, i.e. a ratio between a depth of the bottom section 91B relative to a lateral dimension thereof increases.

The improved AFM-device 1 as disclosed herein mitigates these error sources in that the controller 40 is configured to automatically adapt one or more imaging parameters during scanning in accordance with information about sample properties at the lateral position of the sample currently being scanned. The information about sample properties comprises one or more of information from a specification of the sample, a recipe for manufacturing the sample and information obtained from a scanning according to a previous scan line in a direction substantially parallel to the current scan line. In addition information obtained while scanning a trajectory may also be used to provide additional adaptations on the fly. As a result of said adaptations the imaging parameters are locally optimized for a proper z-measurement. As one example a relatively low force threshold is selected at x,y positions that are predicted to be a position on the surface having a relative high level close to an edge with a lower level surface. As another example a relatively high force threshold is selected at lateral (x, y) positions predicted to be part of a bottom section close to a wall. A further example is an adaptation of a baseline offset in accordance with a predicted height at a lateral position. A still further example is an adaptation of a retract profile in accordance with an estimated adhesion of the sample surface at the lateral position of the tip.

A shown schematically in FIG. 1 the AFM device may comprise an acoustic signal generator e.g. 51*a*, 51*b*, 51*c* to supply an acoustic signal to one or more of the probe 11, the tip 13 or the sample 9 and a signal analysis module 52 to analyze an output signal based on an interaction of the acoustic signal with the sample 9. In that case, the output signal Sout of the tip-deflection sensor is further indicative for subsurface characteristics of the sample. Therewith, in a common measurement both topographic information and subsurface information can be obtained, for example for the purpose of overlay and/or alignment analysis.

Additionally or alternatively, the AFM device may comprise a signal source, for example signal source 51*a*, for inducing a vibration in the probe 11 to increase an effective stiffness of the cantilever 12. The vibration increases the stiffness of the cantilever 12 and therewith also increases the effective force exerted to the sample. In the absence of an induced vibration, the stiffness of the cantilever is determined by the static spring constant of the cantilever. By imposing the vibration, the stiffness is increased. As the deflection of the cantilever 12 is proportional to the ratio of the force exerted by the probe 11 via the tip 13 to the sample 9 divided by the stiffness of the cantilever, the effective force exerted to the sample can be computed from the deflection of the cantilever and its effective stiffness as a function of the induced vibration for example using a computation module 53.

In the example shown in FIG. 1, the AFM device comprises a tip deformation sensor 15 to provide a tip deformation signal $S_{tdf}$, indicative for a deformation of the tip 13. In this example, the controller 40 of AFM-device is configured to reduce the force threshold if the indicated deformation of the tip exceeds a predetermined limit. Alternatively or additionally the AFM-device may be configured to compensate a reconstructed image for this deformation. This optional feature may be provided as an alternative or in combination with other measures taken for control of settings of the AFM-device.

For clarity, interconnections between the controller 40 and the components controlled therewith as well as the connections to the cantilever deflection detector 30 and the tip deformation sensor 15 are not shown. More details are presented in subsequent drawings.

FIG. 2 shows a first embodiment of the improved AFM-device 1 in more detail. In the example shown, the controller 40 comprises a signal analysis unit 41, an image memory 42 and a motion profile generator 45. As further illustrated in FIG. 2, the probe/cantilever deflection detector 30 comprises an optical detection element 31, in this example a four quadrant optical detection element and a deflection signal processing unit 32. The deflection signal processing unit 32 computes the probe deflection from the signal S31 issued by the optical detection element 31 and provides the signal to motion profile generator 45. The motion profile generator 45 generates a control signal Cz to control z-actuator 60 and a control signal Cxy to control xy-actuator 20. The motion profile generator 45 further provides an input signal to image memory 42 that indicates the z-value determined for each pixel with lateral coordinates x,y. For simplicity, it is presumed in this example that the coordinates x,y,z to be stored in the image memory 42 are the coordinates specified by the motion profile generator 45. Typically, the z-value is defined as the vertical "tip position" at the moment a certain predefined force threshold is reached. In practice deviations may occur between the specified coordinates and the actual coordinates. To take this into account typically position sensors (21, 61 see FIG. 1) are provided to sense the lateral position (x,y) of the sample 9 and the vertical position z of the probe 11. The sense signals from these sensors are provided as feedback signal to the motion profile generator 45. Upon completion of the scanning process the topography Z(x,y) of the surface 91 of the sample 9 can be retrieved from the image memory 42.

As shown in FIG. 2 the signal processing unit 41 computes a force threshold setting Ft(x,y) for a lateral position x,y, based on topographic data z(x,y−Δy) from a previous scanline.

Figure 3:
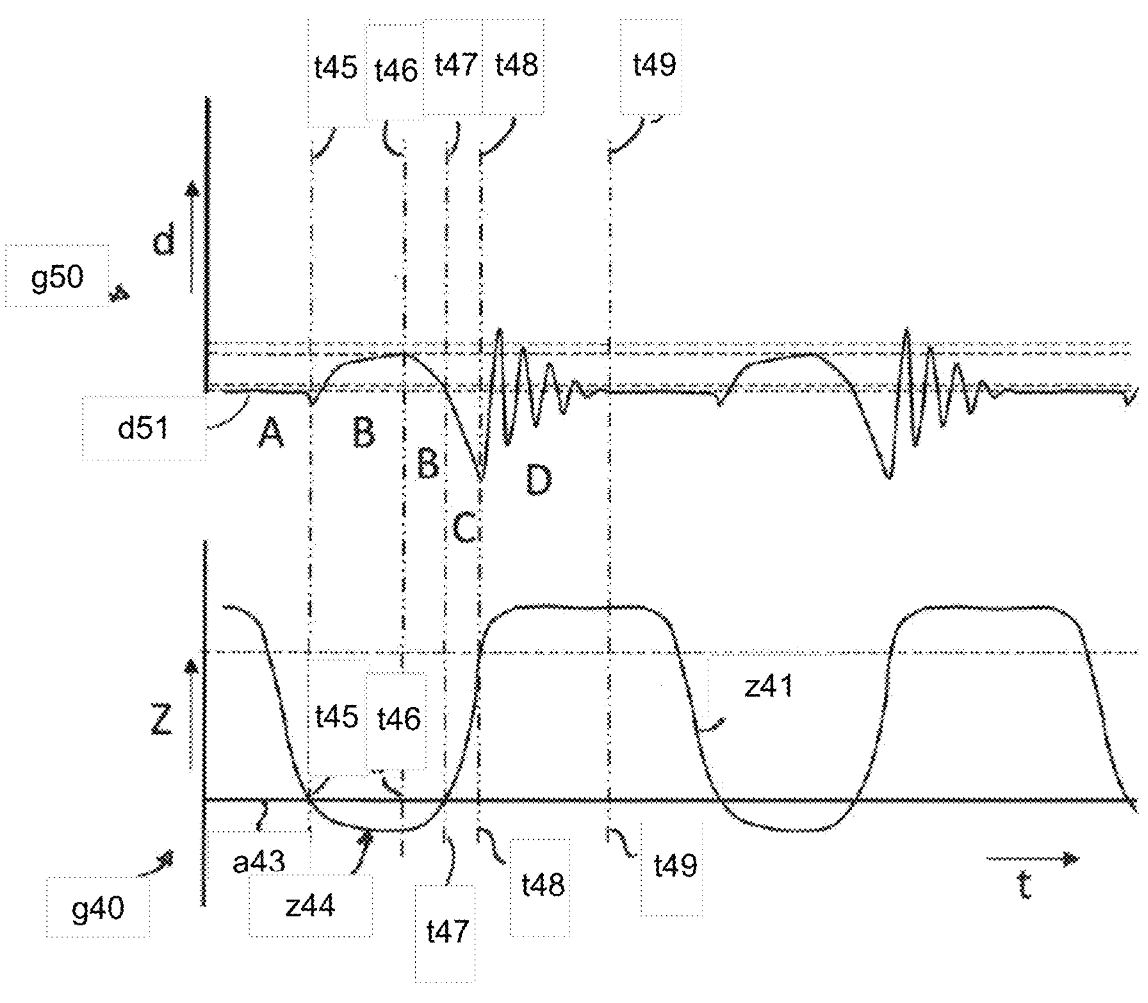
FIG. 3 schematically illustrates two graphs of a Z-position signal for a Z-actuator and for a measured deflection signal from a probe tip in an embodiment of the present invention.
Figure 4:
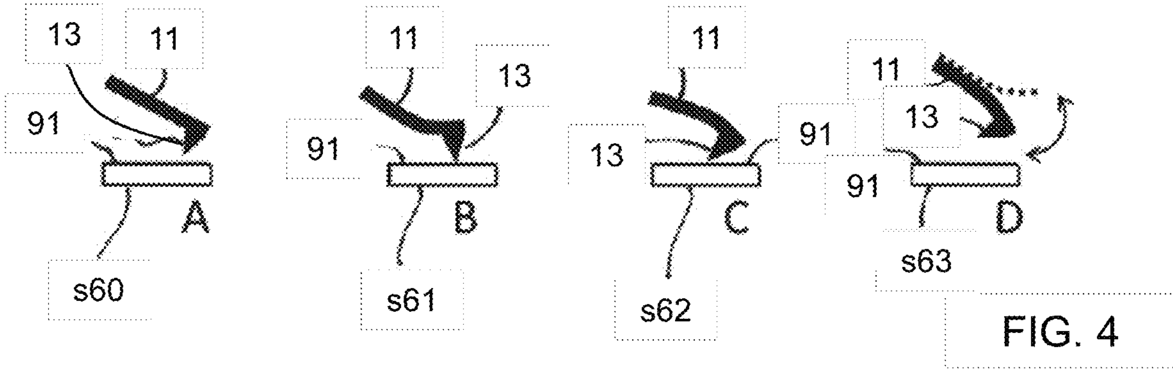
FIG. 4 schematically illustrates four probe deflection situations associated with certain positions in FIG. 3.

The embodiment of FIG. 2 is explained further with reference to FIG. 3 and FIG. 4. FIG. 3 illustrates schematic graphs of a probe deflection signal d51 and the Z-position actuator signal z41 in the embodiment of FIG. 2 during a non-resonant imaging mode. The lower graph illustrates the Z-position actuator signal Cz driving the probe 11 to and from the surface 91 of the sample 9. The horizontal axis is indicative of time t, and the level of axis a43 corresponds with the Z-level at which the probe tip 13 just contacts the surface 91. Extending the probe 11 further towards the surface 91 in the negative Z direction causes the reactive force of the surface 91 on to the probe tip 13 to increase. Thus, at Z-levels below the axis a43, a positive probe-sample interaction force is exerted on the probe tip 13. The upper graph schematically illustrates the deflection signal d51 of the probe tip 13 over time. The deflection signal d51 is represented by parameter d. As can be seen in the lower graph g40, starting from a retracted position at a remote Z-level, the Z position actuator signal z41 further drives the probe 11 (and probe tip 13) towards the surface 91. The vertical lines t45, t46, t47, t48, t49 mark characteristic points in time that will be discussed below. While the probe 11 is extended towards the surface 91 of the sample 9, as indicated by the Z-position signal z41, at point t45 in time, the probe tip 13 first contacts the surface 91 of the sample 9. This is the point where signal z41 crosses the axis a43. In the deflection signal d51, while the probe 11 approaches the surface 91 prior to point t45, in a first stage A of the deflection signal d51, no deflection of the probe tip 13 is measured as is illustrated by the flat portion of the deflection signal d51 in this stage. In FIG. 4, stage A is schematically illustrated in situation s60 showing the position of the probe tip 13 and the probe 11 in relaxed state above the surface 91.

Just upon touching, at time point t45, the probe tip 13 is briefly attracted by the surface 91 as illustrated by the dip in deflection signal d51. The Z-position signal d41 indicates that the probe 11 is further extended towards the surface 91 such as to increase the probe-sample interaction force. The part z44 of the Z-position signal z41 illustrates this by showing a negative Z-position. Extension of the probe 11 towards the surface 91 is continued until at time point t46 the threshold level Ft(x,y) in the probe-sample interaction force is reached. Thereafter, between t46 and t47, the probe 11 is retracted again showing an increase in the Z-position signal z41. A period between moments t45 and t47 wherein the Z-position signal z41 is negative, corresponds with stage B in the deflection signal. Stage B in fact consists of a first and a second part, corresponding to a part before the maximum in the deflection signal d51 prior to point t46, and after the maximum between time points t46 and t47. The situation in stage B is in FIG. 4 schematically illustrated by situation s61. As can be seen, the positive probe-sample interaction force causes the probe cantilever 12 to bend backward thereby providing the positive deflection signal d51 between points t45 and t47 in FIG. 3.

At point t47, the probe 11 is at the Z-position corresponding with the level of axis a43 where the probe-sample interaction force is zero. The probe 11 is further retracted from the surface 91 until the probe tip 13 will be released. However prior to this moment, between time points t47 and t48, adhesive forces pull on the probe tip 13 to thereby exert a negative force on the probe tip 13 such that contact between the probe tip 13 and the sample surface 91 are maintained during retracting the probe. This part of the deflection signal is indicated by stage C.

In FIG. 4, stage C is illustrated by situation s62, showing the negative deflection of the probe tip 13 caused by adhesive forces between the surface 91 and probe tip 13. At time point t48, the probe 11 has been retracted to such an extent that the balance between the adhesive forces and the forces exerted by the Z-actuator 60 can no longer be maintained. Here, the probe tip 13 is released from the surface 91 and starts vibrating at its Eigen frequency. This stage D of the deflection signal d51 is called ringing and is schematically illustrated in FIG. 4 by situation s63. The ringing continues until it dies out and the probe as from time point t49 is in a relaxed state again corresponding to stage A, after which the next extension to the surface may commence. In some examples the next extension already commences before the cantilever is in the relaxed state provided that the ringing amplitude has decreased below a predetermined threshold level. In these examples the cantilever assumes the relaxed state before it has reached the surface. Between points t48 and the next approach to the surface after moment t49, the probe may move in a lateral direction relative to the sample 9 towards a next pixel to the image. This process repeats itself until all pixels have been imaged. For each pixel x,y the value z(x,y) is registered so that a topographic image is obtained of the surface 91 of the sample 9. The selection of the force threshold Ft(x,y) to be used by the motion profile generator 45 is determined by the signal processing unit 41.

The height profile z(x,y) of the surface is estimated from the position of the head and the deflection of the cantilever as discussed with reference to FIGS. 3 and 4. The motion profile generator retracts the probe if the deflection d indicates that the current force threshold Ft is exceeded. The height profile estimated for a neighborhood, for example z(x,y−Δy) is used as an indication of the height profile z(x,y) at the location x,y, and with this information an optimal force threshold Ft(x,y) is selected by the signal processing unit 41. As noted the selection of the optimal force threshold Ft(x,y) may be additionally or alternatively determined by prior knowledge of the sample, e.g. specified topography data and/or recipe creation data and/or analysis results obtained from a current scanline, i.e. from a neighborhood z(x−Δx, y)

In one embodiment the signal processing unit 41 determines the value for the force threshold Ft(x,y) on the basis of image data obtained for the previous scan line y−Δy having a corresponding x-coordinate or having an x coordinate in the region of the currently scanned coordinate x. In some embodiments not only the z-value is registered that is measured at the point in time that the force threshold is reached, but instead a complete force distance curve is registered specifying the relationship between the distance z and the applied force.

In one example, the force threshold Ft(x,y) for a position with lateral coordinates is selected from at least a relatively low threshold value Ftlow and a relatively high threshold value Fthigh dependent on z-values measured on a preceding scan-line (y−Δy) according to the following criterion.

$$Ft(x, y) = \begin{cases} Fthigh \text{ if } z(x, y-\Delta y) \le zt \\ Ftlow \text{ if } z(x, y-\Delta y) > zt \end{cases}$$

It may be contemplated to use also further information from further preceding scanlines −2Δy, −3Δy for example. Although this further information is less predictive for the sample properties at the current position x,y it may be weighted with an appropriate weighting factor. In another example, the selection of the force threshold depends on a region having a width Δy defined by the distance to the preceding scanline and a length dx of a recently scanned portion of the current scanline as follows:

$$Ft(x, y) = \begin{cases} Fthigh \text{ if } \exists\, x' : |x' - x| < dx \wedge (z(x', y-\Delta y) \le zt \vee z(x', y) \le zt) \\ Ftlow \text{ otherwise} \end{cases}$$

In other words, if there is an indication, based on knowledge of a region of the current scan position (x,y) that a feature having a low z-value can be expected, a relatively high force threshold Ft(x,y) is selected for that position. The relatively high force threshold Ft(x,y) facilitates a protruding of the tip to the bottom surface of such features. Hence, this selection improves measurement of features with a low z-value.

In an alternative example, the force threshold Ft(x,y) is determined as:

$$Ft(x, y) = \begin{cases} Ftlow \text{ if } \exists x' : |x' - x| < dx \wedge (z(x', y - \Delta y) \geq zt \vee z(x', y) \geq zt) \\ Fthigh \text{ otherwise} \end{cases}$$

This implies, that if there is an indication, based on knowledge of a region of the current scan position (x,y) that a feature having a high z-value can be expected, a relatively low force threshold Ft(x,y) is selected for that position. The relatively low force threshold Ft(x,y) aims to prevent that the tip slips of the feature with high z-value to a lower position. Hence, this selection improves measurement of features with a high z-value.

Likewise, the width of the region may extend over several preceding scanlines.

In again other embodiments, the threshold force is adapted in accordance with material properties at a sample position x,y, based on prior information about the sample and/or information obtained from the sample during scanning a preceding or current scanline. In an example thereof a relatively low threshold force is used if it is expected, based on prior information about the sample and/or information obtained from the sample during scanning, that the hardness of the surface at the location to be scanned is relatively low and a relatively high threshold force is used if it is expected that the hardness of the surface at the location to be scanned is relatively high.

In these examples the force threshold Ft(x,y) is determined by a selection from predetermined threshold values. In other embodiments the force threshold is determined as a continuous function from prior information about the sample, for example using a polynomial function, for example an interpolation function e.g. a cubic interpolation function, to compute an interpolated threshold value for a location from a plurality of predetermined threshold values known at nearby locations. In still further examples a lookup table is used.

It is noted that the determination of the force threshold Ft by the signal processing unit 41 may be additionally based on recently obtained imaging data from the current scanline y. For example, the signal processing unit 41 may overrule the decision made on the basis of a previous scanline y−Δy if the z-value z(x−Δx, y) determined for lateral position with coordinates x−Δx, y substantially deviates from the z-value z(x, y−Δy) determined for lateral position with coordinates x, y−Δy.

As a further alternative the signal processing unit 41 may compute an average value of a threshold value FtΔx(x,y) determined based on imaging data from the current scanline and a threshold value FtΔy(x,y) determined based on imaging data from the previous scanline with the expression:

$$Ft(x, y) = a_x Ft\Delta x(x, y) + a_y Ft\Delta y(x, y),$$

$$\text{with } 0 < a_x, a_y < 1 \text{ and } a_x + a_y = 1.$$

Figure 5:
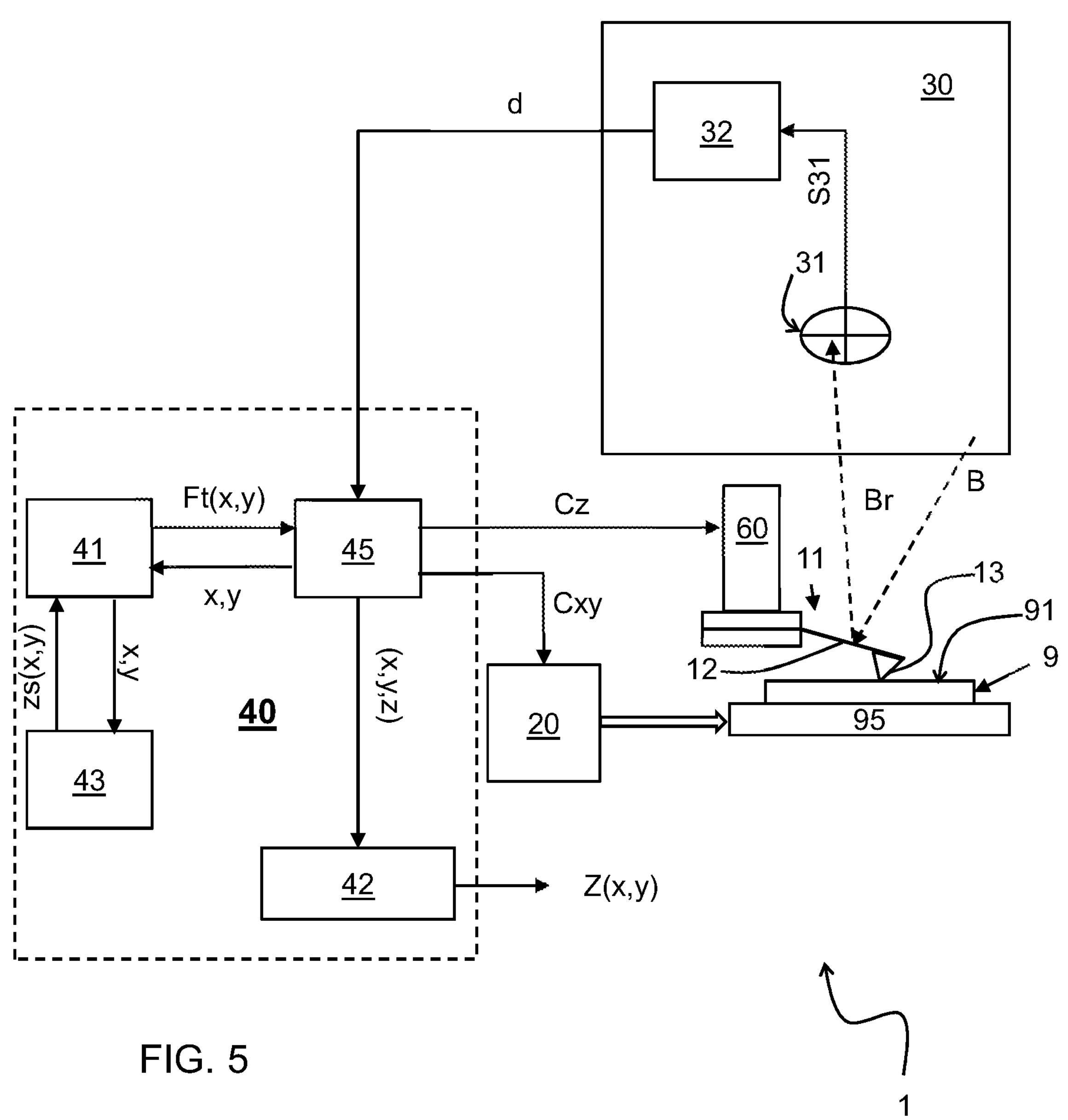
FIG. 5 and shows aspects of a controller of a second embodiment of the improved AFM-device.

FIG. 5 shows an alternative embodiment. Therein the signal processing unit 41 uses topographic information zs(x,y) stored in a topography memory unit 43, available from a specification or recipe of the sample 9. The motion profile generator 45 and/or displacement sensor 21 provide the lateral coordinates x,y of the currently scanned position to the signal processing unit 41, so that the signal processing unit 41 can retrieve the expected z-value for that position zs(x,y) and/or expected z-values of neighboring positions from the topography memory unit 43 in order to determine the force threshold Ft(x,y) to be used by motion profile generator 45 for that lateral position x,y in a manner analogous as described for the embodiment in FIG. 2. In an embodiment the process of determining the force threshold Ft(x,y) involves estimating uncertainties in the values involved in determining the threshold. In accordance with the magnitudes of these uncertainties a different weight may be assigned to independent estimates of the force threshold using various approaches. Estimates having a high uncertainty, i.e. a low reliability are assigned a lower weight than estimates having a low uncertainty. The force threshold Ft(x,y) to be used by motion profile generator 45 can then be determined by a weighted average of the various force threshold estimates in accordance with the assigned weights. As noted a threshold can be estimated on the basis of prior knowledge and topographic information obtained from previous scanlines and/or from preceding positions on the current scanline.

Also in this embodiment the determination of the force threshold Ft by the signal processing unit 41 may be additionally based on recently obtained imaging data from the current scanline y, as described above for the embodiment of FIG. 2.

In a still further embodiment the signal processing unit 41 is configured to determine the force threshold Ft(x,y) for a position with lateral coordinates x,y to be scanned based on a combination of topographic information zs(x,y) from a specification or recipe of the sample 9 as described with reference to FIG. 5 and topographic information z(x,y−Δy) obtained from a previous scanning line y−Δy as described with reference to FIG. 2. In some examples thereof, the signal processing unit 41 is further configured to additionally incorporate recently obtained image data from the same scanline to determine the force threshold Ft(x,y) for a position with lateral coordinates x,y.

As noted above, it is not necessary that the computation of the threshold force is determined by signal processing unit 41 on the basis of information from a single position near the current scan point. Instead, the computation may be based on a region of the current scan point x,y, for example information from a region x−dx<x'<x+dx of the preceding scan line or information from a region of the current scan point specified in design data or recipe data, for example, a region x−dx<x'<x+dx, y−dy<y'<y+dy. In an exemplary embodiment, the signal processing unit 41 selects a relatively high force threshold if the information from the region indicates that the current scan point is expected to be within a narrow trench and selects a relatively low force threshold if the information from the region indicates a wide trench or other relatively flat area.—The current scan point is considered to be in a flat area if within a configurable distance (e.g. 10 times a diameter of the tip) the difference between a maximum surface level and a minimum surface level is less than a configurable factor (e.g. 0.5) times the height of the tip. The precise values of the configurable distance and the configurable factor depend on the stiffness of the tip-cantilever combination. If the stiffness of the tip-cantilever combination is relatively high, the configurable distance can be selected relatively small and the configurable factor relatively high. If the stiffness of the tip-cantilever combination is relatively low, the configurable distance can be selected relatively large and the configurable factor relatively small.

Whereas in the exemplary embodiments described above, the imaging parameter to be adapted by the signal processing unit 41 is the force threshold Ft as a function of the lateral coordinates x,y, in other embodiments the imaging parameter to be adapted is a baseline offset, an approach profile or a retract profile.

Figure 6:
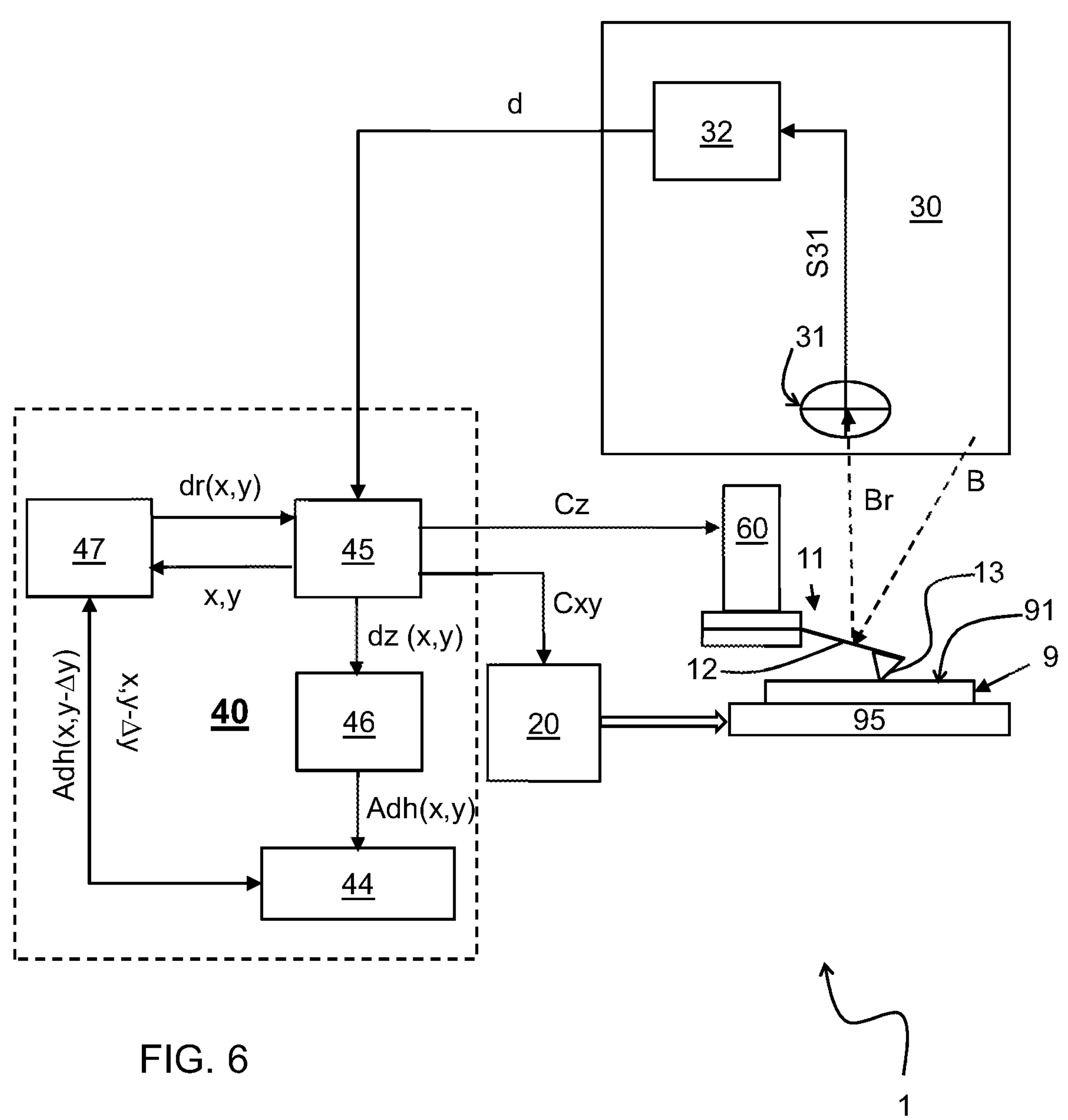
FIG. 6 shows aspects of a controller of a third embodiment of the improved AFM-device.

FIG. 6 shows an exemplary embodiment, wherein the controller 40 comprises an adhesion signal processing unit 47 that determines a control signal dr(x,y) indicative for a retract distance of the retract profile to be used by the motion profile generator 45, i.e. the distance over which the motion profile generator 45 causes the z-actuator 60 to retract the probe 11 away from the sample 9. In the example shown a deflection curve signal processing unit 46 receives deflection curve data dz(x,y) for each scanned position. The deflection curve data dz(x,y) is indicative for the deflection d measured as a function of the translation of the probe z, in particular the data indicating the deflection of the probe during the time interval from t47 to t48. As described with reference to FIG. 3, 4, during this time interval the deflection of the probe 11 is determined substantially by adhesive forces between the tip 13 and the sample 9. With this data the deflection curve signal processing unit 46 estimates a magnitude Adh(x,y) of the adhesive forces at lateral position x,y of the sample and store the value in a memory 44. The adhesion signal processing unit 47 retrieves the data obtained for the magnitude Adh(x,y−Δy) for the previous scan line x,y−Δy and based on the assumption that Adh(x,y) is approximately equal to Adh(x,y−Δy) computes an optimal retract distance for the retract profile. If a relatively high adhesion is expected for the current scanning position, the retract distance is set to a larger value than in the case a relatively low adhesion is expected. In an alternative embodiment, the adhesion signal processing unit 47 performs the computation on the basis of information about the adhesion from a specification or recipe of the sample 9. In a still further embodiment the adhesion signal processing unit 47 is configured to determine the retract distance of the retract profile for a position with lateral coordinates x,y to be scanned based on a combination of adhesion information from a specification or recipe of the sample 9 and information on adhesion obtained from a previous scan line y−Δy. In some examples thereof, the adhesion signal processing unit 47 is further configured to additionally incorporate recently obtained adhesion information from the same scanline to determine the retract distance for a position with lateral coordinates x,y.

Figure 7:
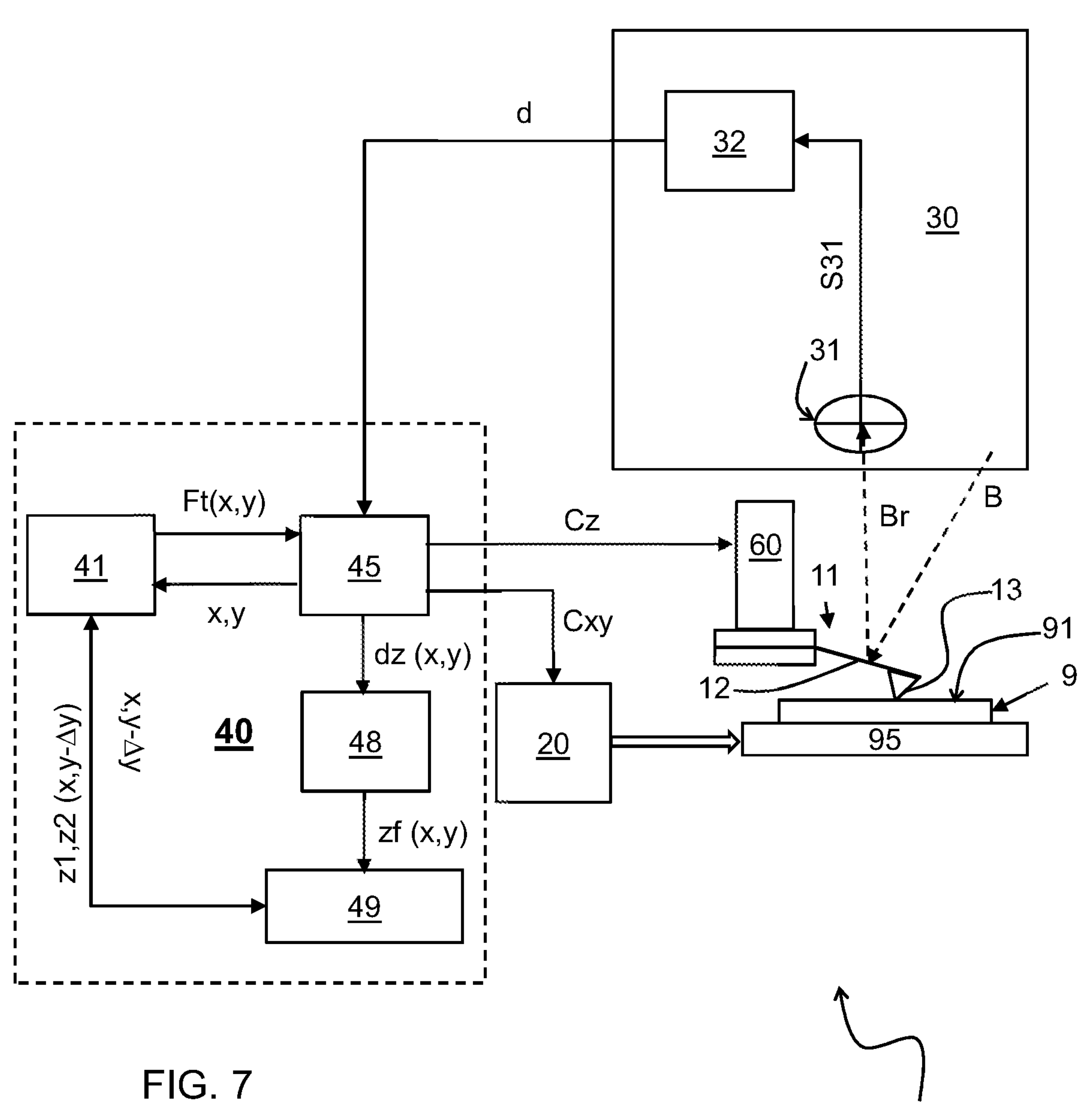
FIG. 7 shows aspects of a controller of a fourth embodiment of the improved AFM-device.

FIG. 7 shows a still further embodiment. As in the example shown in FIG. 6, a deflection curve signal processing unit 48 receives deflection curve data dz(x,y) for each scanned position. However, deflection curve signal processing unit 48 in this embodiment computes the force-distance data for lateral position (x,y) as determined in a time-interval wherein the force becomes positive after t45 until the point in time that the probe is retracted at t46. The force distance data may comprise two or more distances z measured for respective forces. The signal processing unit 41 has access to the force distance data and based thereon it determines which threshold force Ft(x,y) is to be selected for a lateral position x,y based on the two or more distances z1(*x,y*−Δy), z2(*x,y*−Δy) measured for respective forces stored for a lateral position having a coordinate x' at or near the x,y−Δy. In some examples the signal processing unit 41 additionally bases the computation of the threshold force Ft(x,y) on force distance data obtained from the current scan line, e.g. force distance data obtained from the previous scanned position x−Δx, y.

As indicated above, a setting of an imaging parameter may be determined on the basis of a combination of input data obtained from various sources, including two or more of a prior information about the sample obtained from design information, recipe information, information retrieved from imaging data of a previous scanline, information retrieved from recent imaging data of the current scanline, and the like. In case the prior information used for combining is consistent, this is an indication of their reliability. If this is not the case, according to one approach a value of an input parameter used for predicting an imaging parameter to be set may be computed as the average value, e.g. a weighted average value, of the input data obtained from the various sources. Or equivalently, the setting of the imaging parameter may be computed on the basis of each of the input data obtained from the various sources, and the setting of that imaging parameter that is actually used may be computed as the average value, e.g. a weighted average value, of the settings computed on the basis of the various input data. According to another approach, the setting of the input parameter is the most conservative one of the individually predicted settings based on each of the input data. For example, from multiple settings of the force threshold the one with the lowest value is selected to minimize risk of damage of the sample.

The present invention has been described in terms of some specific embodiments thereof. It will be appreciated that the embodiments shown in the drawings and described herein are intended for illustration purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention.

Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of operating an atomic force microscopy (AFM) device, comprising:

scanning a probe with a tip along a surface of a sample along a current scan line in a first lateral direction;

measuring an interaction between the tip and the sample;

based on information about the sample adapting one or more imaging parameters during said scanning, wherein the information about the sample comprises information about the sample obtained prior to said scanning, and the one or more imaging parameters that are adapted during said scanning based on the information obtained prior to said scanning include a force threshold, wherein a relatively high force threshold is selected if information from the region of the current scan position indicates that the current scan point is expected to be within a relatively deep and narrow recess or at a bottom close to a steep wall and a relatively low force threshold is selected if the information from the region indicates a relatively wide recess or wide flat area away from relatively steep and high edges/walls.

2. The method according to claim 1, wherein the information about the sample further comprises information obtained from a scanning according to a previous scan line in a direction substantially parallel to the current scan line.

3. The method according to claim 1, wherein the one or more adapted imaging parameters further comprise a baseline offset.

4. The method according to claim 1, wherein the one or more adapted imaging parameters further comprise an approach profile.

5. The method according to claim 1, wherein the one or more adapted imaging parameters further comprise a retract profile.

6. The method according to claim 1, wherein the information further comprises one or more of information selected from an approximate geometry of the sample, a profile of a previous line, an adhesion and an indication from a lateral displacement sensor.

7. The method according to claim 1, further comprising adapting one or more image parameter settings based on information about the sample obtained for one or more recently scanned positions along a current scanline.

8. The method according to claim 1, further comprising supplying an acoustic signal to one or more of the probe, the tip or the sample and analyzing an output signal based on an interaction of the acoustic signal with the sample.

9. The method according to claim 1, further comprising inducing a vibration of the probe to change an effective stiffness of the cantilever.

10. The method according to claim 1, comprising obtaining a tip deformation signal, indicative for a deformation of the tip, and reducing the force threshold if the indicated deformation of the tip exceeds a predetermined limit and/or process an output signal obtained with the method to compensate for deviations caused by the deformation of the tip.

11. An atomic force microscopy (AFM) device, the device comprising at least one scan head for scanning a sample, the scan head including a probe, the probe comprising a cantilever and a probe tip arranged on the cantilever, wherein the device further comprises:

a first actuator cooperating with at least one of the scan head or a substrate holder for moving the probe tip and the sample relative to each other in one or more directions parallel to a surface of the sample for scanning of the surface with the probe tip;

a cantilever deflection detector for measuring a deflection of the cantilever relative to the scan head during said scanning, the detector being arranged for providing an output signal indicative of said deflection; and a controller configured for receiving and analyzing the output signal from the cantilever deflection detector, for measuring a deflection of the probe and for automatically adapting one or more imaging parameters during said scanning in accordance with information about sample properties near the location of the sample currently being scanned, wherein the information about sample properties comprises information about the sample obtained prior to said scanning, and the one or more imaging parameters that are adapted during said scanning based on the information obtained prior to said scanning include a force threshold, wherein a relatively high force threshold is selected if information from the region of the current scan position indicates that the current scan point is expected to be within a relatively deep and narrow recess or at a bottom close to a steep wall and a relatively low force threshold is selected if the information from the region indicates a relatively wide recess or wide flat area away from relatively steep and high edges/walls.

12. The atomic force microscopy (AFM) device according to claim 11, wherein the information about sample properties further comprises information obtained from a scanning according to a previous scan line in a direction substantially parallel to the current scan line.

13. The atomic force microscopy (AFM) device according to claim 11, wherein the controller is configured to cause the first actuator to move the probe tip and the sample relative to each other according to subsequent scanlines extending in a first direction, and wherein the AFM device further comprises a memory for storing information about the sample obtained while scanning a current scanline, wherein the controller is configured to determine a respective value for said one or more imaging parameters at a scanning position along a subsequent scan line at least based on information about the sample stored in the memory for a region or position of the current scan line corresponding to the scanning position along a subsequent scan line.

14. The atomic force microscopy (AFM) device according to claim 11, further comprising an acoustic signal generator to supply an acoustic signal to one or more of the probe, the tip or the sample and a signal analysis module to analyze an output signal based on an interaction of the acoustic signal with the sample.

15. The atomic force microscopy (AFM) device according to claim 11, comprising a signal source for inducing a vibration in the probe to increase an effective stiffness of the cantilever.

16. The atomic force microscopy (AFM) device according to claim 11, further comprising a tip deformation sensor to provide a tip deformation signal, indicative for a deformation of the tip, the AFM-device being configured to reduce the force threshold if the indicated deformation of the tip exceeds a predetermined limit, and/or to process an output signal obtained with the device to compensate for deviations caused by the deformation of the tip.

17. The atomic force microscopy (AFM) device according to claim 12, wherein the controller is configured to cause the first actuator to move the probe tip and the sample relative to each other according to subsequent scanlines extending in a first direction, and wherein the AFM device further comprises a memory for storing information about the sample obtained while scanning a current scanline, wherein the controller is configured to determine a respective value for said one or more imaging parameters at a scanning position along a subsequent scan line at least based on information about the sample stored in the memory for a region or position of the current scan line corresponding to the scanning position along a subsequent scan line.

18. The atomic force microscopy (AFM) device according to claim 12, further comprising an acoustic signal generator to supply an acoustic signal to one or more of the probe, the tip or the sample and a signal analysis module to analyze an output signal based on an interaction of the acoustic signal with the sample.

19. The atomic force microscopy (AFM) device according to claim 17, further comprising an acoustic signal generator to supply an acoustic signal to one or more of the probe, the tip or the sample and a signal analysis module to analyze an output signal based on an interaction of the acoustic signal with the sample.

20. The atomic force microscopy (AFM) device according to claim 12, further comprising a tip deformation sensor to provide a tip deformation signal, indicative for a deformation of the tip, the AFM-device being configured to reduce the force threshold if the indicated deformation of the tip exceeds a predetermined limit, and/or to process an output signal obtained with the device to compensate for deviations caused by the deformation of the tip.

* * * * *